Aug. 7, 1934.                J. A. RAMOS ET AL                1,968,852
                              ALL PHASE MOTOR
                            Filed April 13, 1932            3 Sheets-Sheet 1

JOSEPH A. RAMOS &
POMPEY P. SCRIBANTE.
            INVENTORS.
BY
            ATTORNEY.

Aug. 7, 1934.  J. A. RAMOS ET AL  1,968,852
ALL PHASE MOTOR
Filed April 13, 1932  3 Sheets-Sheet 3
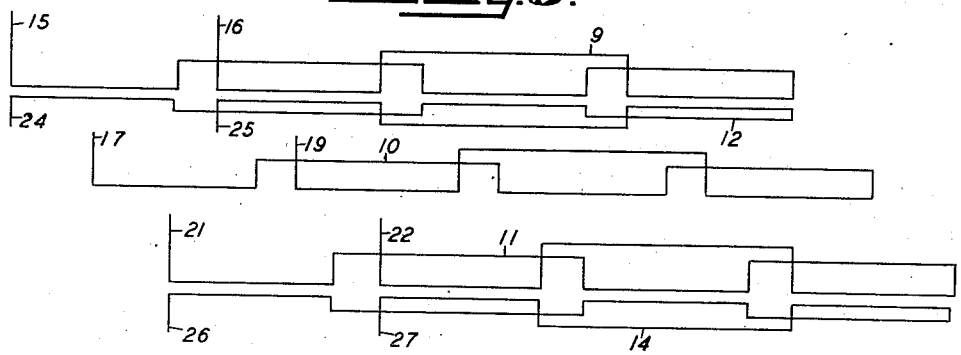
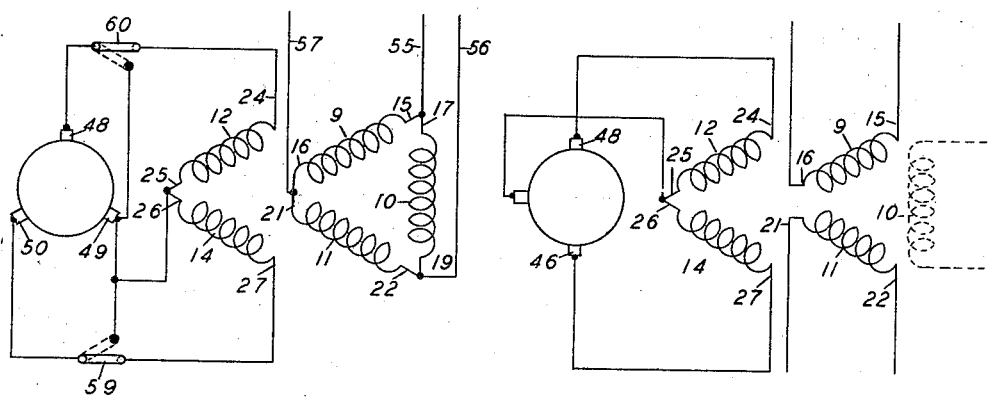
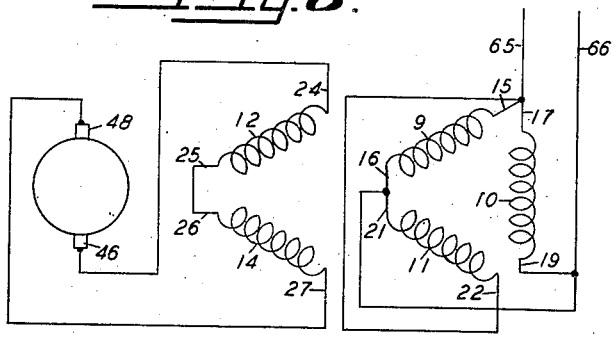
JOSEPH A. RAMOS &
POMPEY P. SCRIBANTE.
INVENTORS.
BY
ATTORNEY.

Patented Aug. 7, 1934

1,968,852

UNITED STATES PATENT OFFICE 1,968,852

ALL-PHASE MOTOR

Joseph A. Ramos and Pompey P. Scribante, San Francisco, Calif., assignors of twenty-ninetieths to Benjamin Delmas, twenty-ninetieths to Paulin Cahors and sixteen-ninetieths to Ruben Smith, all of San Francisco, Calif.

Application April 13, 1932, Serial No. 604,972

8 Claims. (Cl. 172—280)

Our invention relates to alternating current motors, and particularly to motors adapted for operation from supply sources of various phase relationship.

Among the objects of our invention are: To provide a motor to give substantially equal output when operated from either single phase, quarter phase, or three phase supply; to provide a motor which may be operated from any of the above mentioned types of supply with either shunt or series speed characteristics as desired; to provide an all-phase motor whose speed and torque are under control when operated with either shunt or series speed characteristics and upon supply of any desired phase; to provide an all-phase motor wherein the windings are of great simplicity and are easy of construction; and to provide a motor which is particularly adapted to the use of contractors and other users of equipment of semi-portable character, which must be moved from place to place regardless of the phase of the available power supply.

Other objects of our invention will be apparent or will be specifically pointed out in the description forming a part of this specification, but we do not limit ourselves to the embodiment of our invention herein described, as various forms may be adopted within the scope of the claims.

Referring to the drawings:

Figure 5 is a schematic diagram of a different type, indicating the connection of the field and compensating winding.

Figures 6, 7 and 8 are connecting diagrams indicating the connections of field windings, compensating windings, and brushes, for three phase, quarter phase, and single phase operation respectively.

Figure 1:
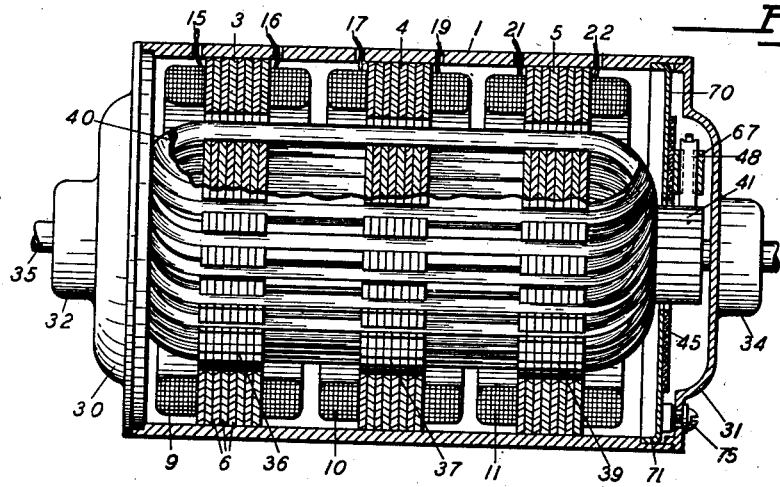
Figure 1 is a view of the motor of our invention, partly in elevation and partly in section, showing the arrangement of field and armature cores and windings.
Figure 2:
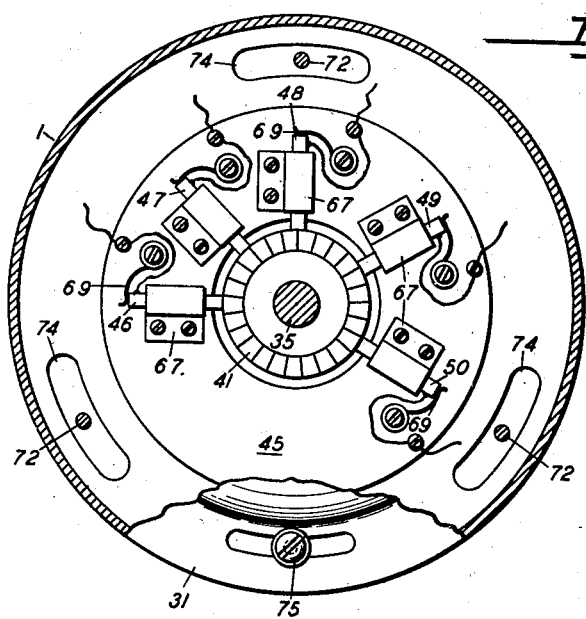
Figure 2 is an end view of the commutator and brush rigging of the motor of our invention, illustrating the angular disposition of the brushes.

Briefly described, the motor of our invention comprises the usual frame, spaced along the axis of which are a plurality of core units, each provided with a single phase winding to produce a desired number of radial poles. An armature is mounted to rotate on the axis of the frame, the armature preferably comprising a plurality of separate core units, each unit being positioned to cooperate with a corresponding field core unit. A single armature winding threads all of the armature core units. This winding may be of the squirrel cage type, but preferably comprises a distributed winding of the lap type connected with a commutator and also preferably having equalizing connections. Certain of the field core units also have auxiliary compensating windings, the commutator being provided with a plurality of sets of brushes which may be connected to the compensating winding. Separate connections are supplied for each of the field windings, and with the structure described these windings may be connected either three phase, two phase, or all connected in parallel, in which case the motor will operate satisfactorily on single phase. Short-circuiting connections may also be provided for the brushes, so that the motor may be operated either with series characteristics as a repulsion motor by short-circuiting the brushes, or with shunt characteristics by connecting the compensating windings as described. It will also be obvious that for special purposes various expedients which are well known in connection with motors of the usual construction, such as the inclusion of a deeply embedded squirrel cage winding beneath the commutated winding, may be adopted, in order to give the advantages of high starting torque and high efficiency when running.

In the embodiment of our invention shown in the drawings, the motor frame 1 carries the three stator units 3, 4 and 5 spaced along its axis. Each of these stator units comprises the usual laminations 6, which are slotted to receive the exciting winding.

Figure 4:
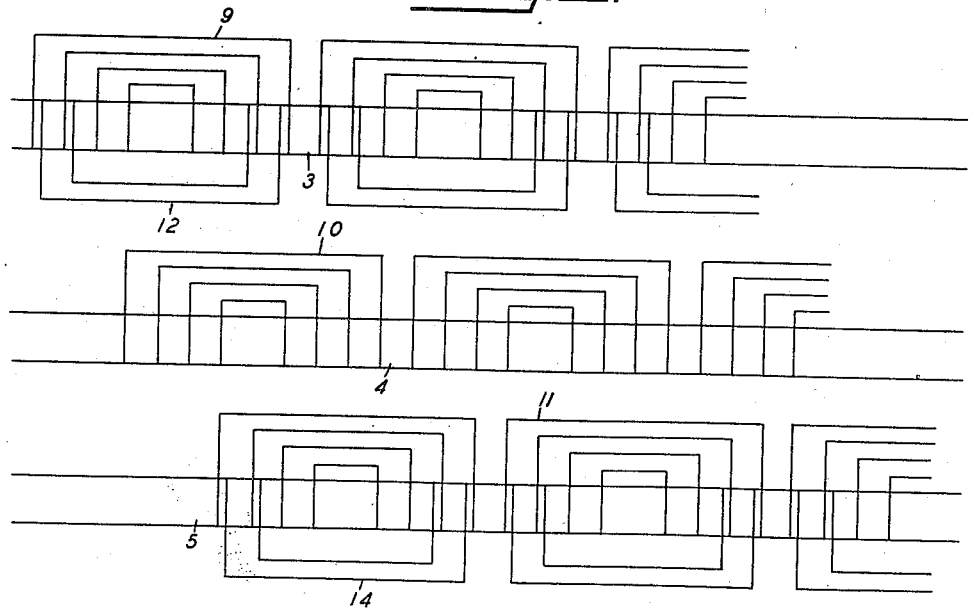
Figure 4 is a schematic diagram of the field and compensating windings upon the various core units of the stator.

A developed schematic layout of the windings is shown in Figure 4. The three stator core units 3, 4 and 5 each carries a main field winding 9, 10 and 11 respectively. In addition to these main windings, the field units 3 and 5 carry auxiliary windings 12 and 14 respectively. As indicated in the diagram, the windings are so disposed as to produce four poles on each of the stator core units, the poles of the auxiliary windings 12 and 14 coinciding with those of the main windings 9 and 11. Figure 5 shows the winding layout in a different form, indicating the manner in which the connections are brought out. The reference characters 15 and 16 indicate the terminal connections of the winding 9, 17 and 19 the terminal connections of the winding 10, and 21 and 22 the terminals of the winding 11. In like manner 24 and 25 indicate the terminals of the auxiliary winding 12, and 26 and 27 the terminals of the winding 14.

The three field core units are angularly displaced with respect to each other, so that the poles are distributed uniformly around the frame. In the present case, wherein three core units are used, in connection with a four pole structure, the three windings are set 120 electrical degrees or 60 degrees of arc apart with respect to a line parallel to the axis of the motor.

The motor frame 1 is provided with end bells 30 and 31 carrying bearing boxes 32 and 34 respectively, within which is journaled an armature shaft 35.

Figure 3:
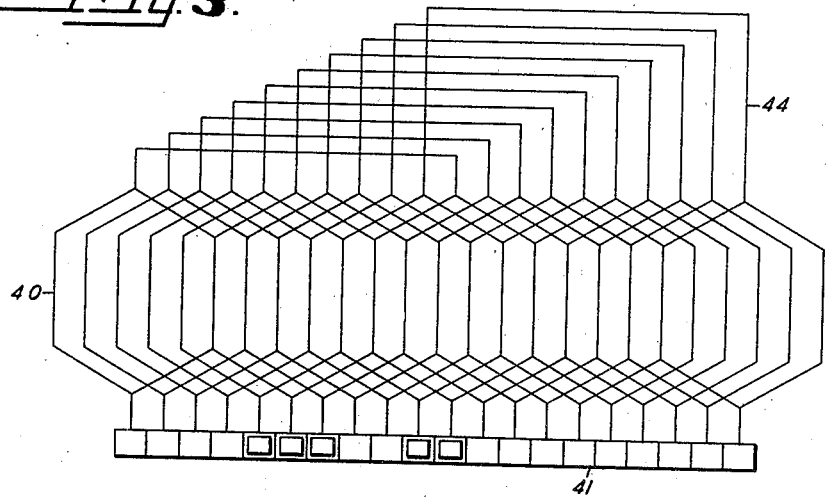
Figure 3 is a schematic showing of an equalized lap winding suitable for use on the motor armature.

The armature structure may be of the usual type, but preferably comprises a series of spaced units or groups of laminations 36, 37 and 39, each of which is coplanar with one of the field core units. A single armature winding 40 threads all of the armature core sections. For certain uses the armature winding may be of the familiar squirrel cage type, but it is preferred to use a wound rotor which is connected to a commutator 41. A suitable type of winding is that indicated diagrammatically in Figure 3, which shows a twenty slot lap winding having ten-lap equalizer connections 44. This construction permits the use of a single pair of brushes per phase in a four pole motor, which simplifies the interconnection of the windings and their various combinations for different uses.

A brush holder 45 supports the brushes which are indicated by the reference characters 46 to 50 inclusive. The brushes 46, 47 and 48 are spaced 45 degrees of arc or 90 electrical degrees apart. The brushes 48, 49 and 50 are spaced 60 degrees of arc or 120 electrical degrees apart.

Figures 6 to 8 inclusive show the method of connecting the various windings for various types of supplying source. Figure 6 indicates a three phase connection, wherein the windings 9, 10 and 11 are each connected across one phase of the three phase supply mains 55, 56 and 57. With this connection the compensating windings are connected with the terminals 24 and 25 of coil 12 leading to brushes 48 and 49 respectively, while the terminals 26 and 27 of coil 14 connect respectively to brushes 49 and 50. In order to simplify the drawings these schematic diagrams are shown with the brushes spaced as for a two pole motor, i. e., the angular spacing of the brushes indicates their spacing in electrical degrees.

It will be seen that with the connection shown the compensating windings are connected in open delta to the three phase brush system. The turns of the compensating winding are so proportioned with respect to the armature winding that the flux linkages due to the compensating coil and cutting the armature coil through the single armature unit 36, are substantially equal and opposite to the flux linkages with the armature winding which are produced in that winding by the armature current, although this latter flux is distributed through all of the armature core units. The result of this relationship is that the self-inductance of the armature circuit is largely neutralized, and the motor, connected in this manner, has a speed-load characteristic which is essentially similar to that of the D. C. shunt motor. That is, the motor is essentially a constant speed device, there being but slight variation in speed due to changing loads. By throwing the switches 52 and 53, however, the compensating windings are opened and the motor brushes short-circuited, which gives a repulsion motor combination whose speed varies inversely with the load.

For two phase operation the windings 9 and 11 are each connected across one phase of the supply, the coil 10 not being in use, as is indicated by its dotted representation in this figure. Compensating winding 12 in this case has its terminal 24 connected to brush 48 as before, the terminal 25 connects with brush 47, as does terminal 26 of winding 14, while terminal 27 of winding 14 connects with brush 46. In this case the compensating field produced by the windings 12 and 14 is slightly displaced in space from the primary field in the armature cores due to the armature winding itself. Experience shows, however, that this slight departure from the theoretically ideal condition is of no particular moment, and that the performance of the motor connected in this manner is substantially the same as on three phase, it being assumed, of course, that the supply voltages are properly chosen.

For single phase operation the three field coils are connected in parallel to the two supply mains 65 and 66, terminals 15, 17, and 22 being connected to the lead 65, while the auxiliary windings connected with terminal 24 leading to brush 46, terminal 27 to brush 48, and terminals 25 and 26 connected together so that the two compensating windings are in series. An alternative connection for single phase operation is with the two coils in parallel, terminals 24 and 27 connecting to brush 46, and terminals 25 and 26 to brush 48, the choice of the two connections depending upon the degree of equalization desired.

With any of the connections described the speed of the motor may be adjusted by rotating the brushes, thus varying the degree of compensation and the torque produced by the reaction of the armature and field fluxes.

Various types of brush rigging may be used to accomplish the brush adjustment. In the form shown in the drawings, the brush holder 45 is a ring of fibre or other insulating material which carries fitting 67 within which the brushes slide. Springs 69 press the brushes against the commutator.

The brush holder is mounted on a disk 70 having an inturned flange 71, which rests against the end of the frame 1 within the end bell 31. The proper adjustment of the brushes is secured by rotating the disk, whose motion is limited by pins 72 passing through arcuate slots 74 formed in the disk. When the desired adjustment is obtained, the brush rigging may be locked in place by tightening the screw 75, which clamps the disk 70 to the end bell.

We claim:

1. An alternating current motor comprising a plurality of field core units spaced along a common axis, a single phase field winding on each of said units disposed to produce radial poles thereon, individual compensating windings disposed on certain of said units, an armature positioned to cooperate with all of said field units, a winding on said armature positioned to cut the fields of all of said units, and connections from said armature to said compensating windings.

2. An alternating current motor comprising a plurality of field core units spaced along a common axis, a single phase field winding on each of said units disposed to produce radial poles thereon, individual compensating windings disposed on certain of said units, an armature positioned to cooperate with all of said field units, a winding on said armature positioned to cut the fields of all of said units, a commutator connected to said armature winding, and brushes interconnecting said armature winding and said compensating windings.

3. An alternating current motor comprising a plurality of field core units spaced along a common axis, a single phase field winding on each of said units disposed to produce radial poles thereon, individual compensating windings disposed on certain of said units, an armature positioned to cooperate with all of said field units, a winding on said armature positioned to cut the fields of all of said units, a commutator connected to said armature winding, and brushes interconnecting said armature winding and said compensating windings, said brushes being positioned in angular relationship with said armature winding such that the fluxes introduced by currents from said armature winding in said compensating windings act successively in said core units to neutralize the inductance of the armature coils.

4. An alternating current motor comprising a frame, three field core units spaced axially along said frame, a single phase winding disposed on each of said core units to produce radial poles thereon, said windings being angularly displaced with respect to each other to provide a uniform angular distribution of poles about said frame, compensating windings on two of said core units, an armature in cooperative relationship with all of said core units, a winding on said armature, a commutator connected to said windings, individual connections to each of said field coils to permit their optional connection in single phase, three phase, or quarter phase relationship, and means for connecting said compensating windings with said commutator in proper angular relationship to provide current in correct phase for any of said optional field connections.

5. An alternating current motor comprising a frame, three field core units spaced axially along said frame, a single phase winding disposed on each of said core units to produce radial poles thereon, said windings being angularly displaced with respect to each other to provide a uniform angular distribution of poles about said frame, an armature mounted in cooperative relationship with all of said units and comprising three individual core units substantially coplanar with corresponding field units, an armature winding threading all of said armature core units, compensating windings on two of said field core units, individual connections to each of said field windings to permit their connection in various phase relationships, and means for connecting said armature winding to said commutator winding in proper angular position to supply compensating current thereto in any of said possible phase relationships.

6. An alternating current motor comprising a plurality of separate field core units, a plurality of separate armature core units, a single phase winding on each of said field core units, a winding threading all of said armature core units, and compensating windings on certain of said field core units and so related to said armature winding that the total flux linkages with said armature winding produced through one of said field core units by said compensating winding is substantially equal and opposite to the flux linkages produced in all of said armature units by the armature current.

7. An alternating current motor comprising a plurality of field core units spaced along a common axis, a single phase field winding on each of said units disposed to produce radial poles thereon, compensating windings disposed on certain of said units, an armature positioned to cooperate with all of said field units, equalizing connections between the coils of said armature winding, a commutator connected to said winding, and a plurality of sets of brushes contacting said commutator, the brushes of each set being disposed at a different electrical angle from the brushes of any other set, whereby by proper combination of field connections and brush connections to said compensating windings the motor will operate on any of a plurality of phase relationships.

8. An alternating current motor comprising a plurality of separate field core units spaced along an axis, a plurality of separate armature core units cooperatively associated with said field core units, a separate single phase winding on each of said field core units, a single winding threading all of said armature core units, compensating windings on certain of said field core units, and means for interconnecting said windings to permit said motor to operate optionally on single phase, quarter phase, or three phase supply.

JOSEPH A. RAMOS.
POMPEY P. SCRIBANTE.